UNITED STATES PATENT OFFICE.

ALFRED H. COWLES, OF SEWAREN, NEW JERSEY, ASSIGNOR TO THE ELECTRIC SMELTING AND ALUMINUM COMPANY, OF SEWAREN, NEW JERSEY.

METHOD FOR MAKING ALKALI-SILICO-ALUMINATE RICHER IN ALKALI THAN FELDSPAR.

1,111,881.   Specification of Letters Patent.   Patented Sept. 29, 1914.

No Drawing.   Application filed September 11, 1913. Serial No. 789,394.

*To all whom it may concern:*

Be it known that I, ALFRED H. COWLES, a citizen of the United States, and a resident of Sewaren, in the county of Middlesex and State of New Jersey, have invented certain new and useful Methods for Making Alkali-Silico-Aluminate Richer in Alkali than Feldspar, of which the following is a specification.

My invention relates to a method for making alkali-silico-aluminate, richer in alkali than feldspar.

To carry out my invention, I subject, either in a rotary, or other form of chamber furnace, finely divided clay, or potash feldspar or feldspar mixed with clay or bauxite, either dry or not, in the pulverulent form, or in the form of small masses to the vapors of salt and water.

In Ser. No. 738,455 I have specifically claimed the process in which the materials to be converted are introduced into the furnace in a finely divided state, and I do not claim this in the present application. In the present application the object sought is the conversion of the material in the form of small masses (as defined later on) and also the combination with carbon or carbonaceous materials, as explained in former patents issued to me I have found that the rapidity of conversion of clay into alkali-silico-aluminate in an atmosphere of vapor of salt and vapor of water, or in contact with salt and vapor of water, is dependent upon the amount of surface that is exposed to the salt and vapor of water. This conversion occurs almost instantly when finely ground feldspar or clay, freed from uncombined water is reduced to its dust form and so treated. There takes place the following reaction, which, for pure clay, is typical of the process:—

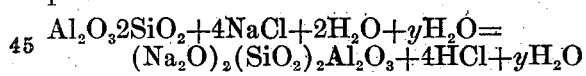
$Al_2O_3 2SiO_2 + 4NaCl + 2H_2O + yH_2O =$
$(Na_2O)_2(SiO_2)_2Al_2O_3 + 4HCl + yH_2O$ From this it will be seen that the hydrochloric acid (4HCl) must have sufficient water $2H_2O$ (and $yH_2O$) either from the admission of steam or from the combustion gases to give the requisite amount of water in the vapors to furnish sufficient water for the full reaction and to materially aid in the condensation of the HCl produced. This quantity of water will vary according to the design of the hydrochloric acid condensing system and the amount of water that may be admitted as water to the coke towers.

My process may be carried on in various types of furnace, if connected with the furnace there is a dust condensing system, so all dust formed, which is mostly condensed vapor of salt, may either fall back into the chamber into which salt, silico-aluminous material and steam are blown with highly heated combustion gases.

It is essential that the walls of the chamber shall be made of material not easily fluxed by soda or potash. An aluminous lining in the form of bricks, or otherwise, made from bauxite, or a brick made from a clay containing several per cent. more alumina than is in the clay of the material that is being treated will prevent the hottest of the furnace from fluxing away. The dust chamber and pipes leading thereto and the pipes carrying the acid away from the same can all be made of iron, as hydrochloric acid does not attack iron, unless cooled below the boiling point of the acid, so that condensation can occur.

The process can also be carried out in the ordinary type of rotary cement furnace. In this case a mixture of clay and salt, or an alkali chlorid and aluminous material to which carbon or carbonaceous material may be added, in small masses slightly agglutinated together by dampening is fed into the reacting and heated furnace, in the proportion, say, of 156 parts of clay, or aluminous material containing about 51 parts of alumina and 112 parts of alkali chlorid. This mixture is fed into the furnace of vapor of water over and above that required to decompose the 112 parts of salt, or alkali chlorid. The reaction begins as low as the melting point of salt, and is very rapid at about 1800 degrees Fahr., when salt vapor is formed with rapidity. When the furnace is rotated the charge reaches the hotter zones and the salt vapors leave the small masses of clay with which the salt is mixed. The reaction goes on very fast due to the dust of clay formed in an atmosphere of salt and water, and when portions of such dust settle in the upper part of the furnace it again returns to the heated zone, most of it passing through the same along with the converted material that has entered the zone of sintering, although it is best that the material should not be melted, other than being mixed with the molten salt somewhat above the zone of hottest temperature. All materials caught in the dust chamber should either slide back or be conveyed back into the rotary furnace. High tension electric currents transmitted through the gases give the suspended dust particles electric charges and cause precipitation of all suspended particles of salt or other solid material, through electric attraction or repulsion, the hydrochloric acid being drawn away to a condensing system by suitable means. Cyclonic or other dust collectors formed of brick and clay may be employed.

In the rotary furnace the masses as they approach the converting zone should not be as large as hickory nuts, and preferably not larger than peas. It is advisable, and in fact necessary, to protect the portions of the furnace that are made of iron or parts attackable by hydrochloric acid from the action of such acid. As long the temperature of the hydrochloric acid fumes is kept above the condensing point, it will not attack iron. There are several means of protecting the said parts of the furnace, one is by means of a lining of, say, high melting point, pitch or similar material sufficiently resistant to the action of the hydrochloric acid to be unacted upon, and the other is to provide means of retaining the heat in the iron, or supplying sufficient heat thereto, by means of an external covering or casing.

It is to be noted that the size of the pieces fed into the rotary furnace at the mouth may vary greatly, the important thing being that when they are brought within the zone of chemical action, that is the chemical action, in the furnace they be presented to said action in a condition to present a large surface as compared to unit mass to the converting action of the vapor of water and salt, especially as the action begins below the melting temperature of salt.

I do not herein specifically claim the application of the process of subjecting the mass in a "finely divided" or dust condition to the action of the combustion gases and the vapors mentioned, that forming the subject of claims in my application Ser. No. 738,455, filed Dec. 24, 1912.

When I use the term "small masses", I mean masses not as large as hickory nuts and preferably not larger than peas.

In my former patents I have set forth the process in which carbonaceous material is added to the other material to produce alkali-silico-aluminate. In the present invention carbonaceous materials, such as charcoal, ground coke, sawdust, etc., may be added to the material before treatment, and it will still be within the scope of my invention, as in the rotary furnace it serves as a fuel and results in the production of a pure acid, since impurities of the nature of iron chlorids are reduced to their oxid condition, and upon reaching the heated zone do not volatilize away from the alkali-silico-aluminate and prevents these volatile chlorids from vitiating the hydrochloric acid. Such carbonaceous material present in the charges in minor percentages does not interfere in the hotter zones of the furnace with the maintenance of a necessary oxidizing condition. To help maintain this oxidizing condition, air may be blown into the furnace together with the excess water vapor mentioned above. This action of carbonaceous material has been referred to in the patents above mentioned. Without carbon in the charge the acid will contain iron chlorid, but the product will be much freer from iron.

Having thus fully set forth my invention and the manner in which it is to be carried out, what I claim, is:—

1. The method of forming alkali-silico-aluminate and hydrochloric acid which consists in subjecting a material containing silica and aumina and carbon to the action of vapor of water and vapor of salt in a rotary furnace, the material acted upon presenting large areas of surface to unit of mass exposed.

2. The method of forming alkali-silico-aluminate, which consists in forming a mixture of clay carbon and salt into small masses, and subjecting the masses thus formed in a rotary furnace to the action of water vapor and furnace combustion gases.

3. The method of forming alkali-silico-aluminate and hydrochloric acid, which consists in subjecting a mixture of clay carbon and salt in small masses in a rotary furnace to high temperature and vapor of water, precipitating the dust particles formed, and separately collecting the resulting solid product.

4. The method of forming alkali-silico-aluminate and hydrochloric acid, which consists in adding to a mixture of clay and salt carbon in a finely divided condition, forming the resulting mixture into small masses, and subjecting the same in a rotary furnace to the action of combustion gases and vapor of water, the vapor of water being sufficiently in excess to aid in the condensation of the hydrochloric acid product.

5. The method of forming alkali-silico-aluminate and hydrochloric acid, which consists in feeding salt carbon and aluminous material agglutinated together into small masses into the converting zone of a rotary furnace, blowing steam, air and water into the lower end of said furnace, maintaining the portions of the furnace attackable by the acid at a temperature above the boiling point of strong hydrochloric acid, and removing and utilizing the vapor of water and hydrochloric acid fumes coming from the furnace.

6. The method of forming alkali-silico-aluminate and hydrochloric acid, which consists in forming a mixture of clay carbon and salt, subjecting said mixture in small masses in a rotary furnace to the action of water vapor and furnace combustion gases in a furnace, and surrounding the mixture under treatment by a material so basic that the melting point of their alkali and iron oxid flux is higher than the melting point of the converted material coming into contact therewith.

7. The method of forming alkali-silico-aluminate and hydrochloric acid, which consists in forming a mixture of aluminous material carbon and salt and subjecting it in small masses in a rotary furnace to the action of vapor of water and furnace combustion gases in a furnace, the walls of said furnace being formed of a material which fluxes at a higher temperature than the material operated upon.

8. The method of forming alkali-silico-aluminate and hydrochloric acid, which consists in feeding into a rotary furnace aluminous material carbon and salt, subjecting it in small masses to the vapor of water and furnace combustion gases, maintaining the temperature of the acid-attackable portions of the furnace higher than the condensing point of strong hydrochloric acid, and separately collecting the hydrochloric acid and the solid products.

9. The chemical method, which consists in subjecting in small masses aluminous material carbon and salt to the action of vapor of water and combustion gases at high temperature in a rotary furnace, separating the chlorin from the salt of the original mixture and concurrently forming alkali-silico-aluminate.

Signed at Sewaren, in the county of Middlesex and State of New Jersey this 26th day of Aug., A. D. 1913.

ALFRED H. COWLES.

Witnesses:
LEWIS H. COWLES,
A. STETSON.